Nov. 25, 1947.      J. MONAHAN      2,431,412
UNIT FOR GILL-DRAWING FRAMES
Filed Aug. 21, 1946
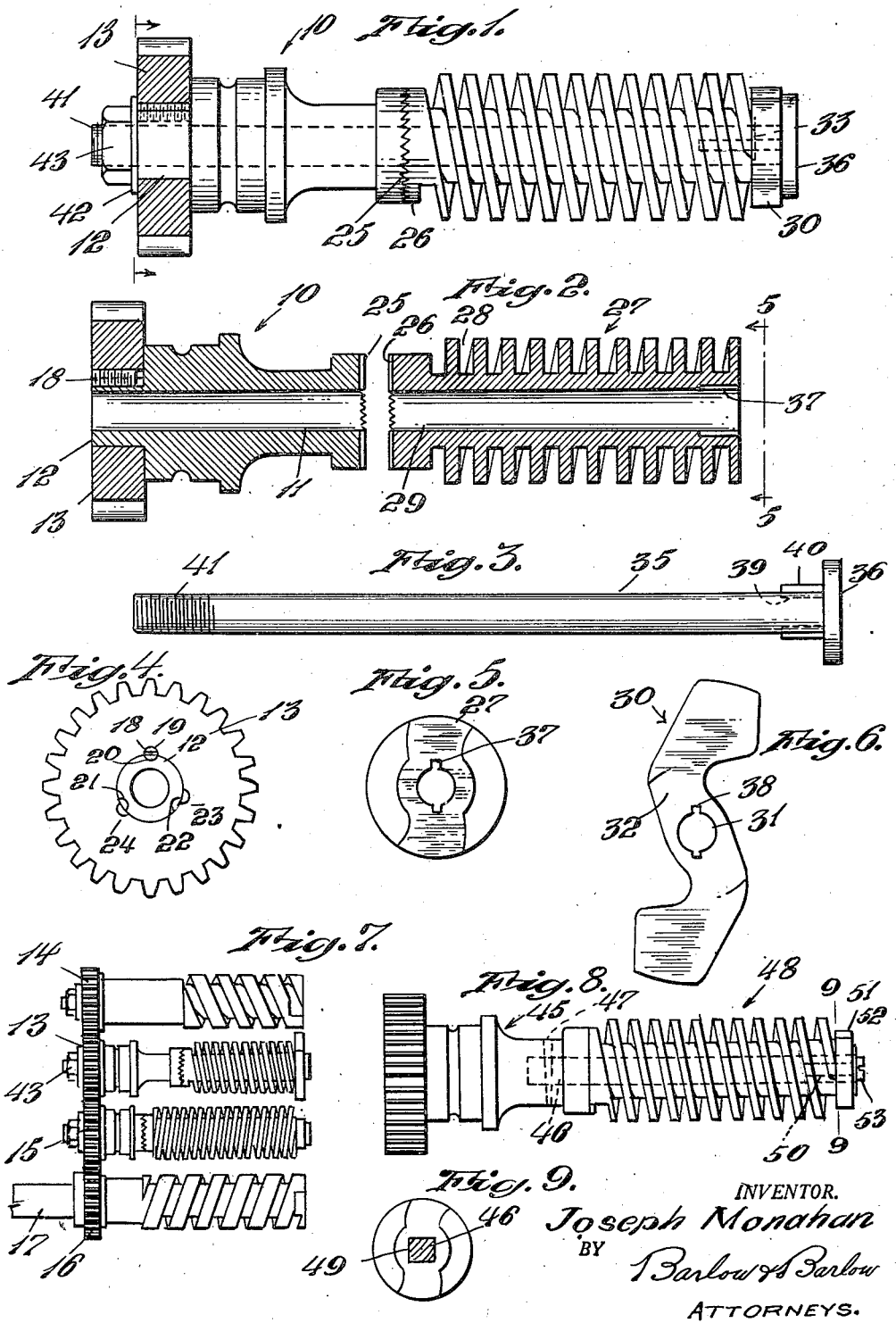
INVENTOR.
Joseph Monahan
BY
Barlow & Barlow
ATTORNEYS.

Patented Nov. 25, 1947

2,431,412

UNITED STATES PATENT OFFICE 2,431,412

UNIT FOR GILL-DRAWING FRAMES

Joseph Monahan, Pawtucket, R. I.

Application August 21, 1946, Serial No. 692,063

3 Claims. (Cl. 19—129)

This invention relates to a gill-drawing frame and more particularly to a means for adjusting the helically grooved faller bar actuating means.

In the gill-drawing frame or gill box of the type which has two opposite sets of faller bars which are arranged with their teeth or pins intersecting and adapted to be traversed through the fibers in one direction and then returned at the end of their stroke to repeat the traverse, gears are provided for driving helically grooved members for actuating the faller bars. Cams are located at the ends of the helical members or screws for manipulation of the faller bars and it is sometimes necessary to remove the helically grooved members from the machine and to replace them. The timing of the cams which are fixed to the ends of the helically grooved members and the gears which drive them is a difficult matter and frequently requires considerable withdrawing of a gear from its meshing relation and trying the gears in different positions in order that the correct timing may be acquired. Also in the use of a cam at the end of a helically grooved member frequently parts of this cam are so cut away that the cam is weakened.

One of the objects of this invention is to provide a means for more easily adjusting the relative positions of the helically grooved member and the gear which drives it so that replacement of the helically grooved members in the machine may be more quickly accomplished.

More specifically an object of this invention is to provide a relative adjustment between the helically grooved member and the gear which drives it by separating the bearing portion and the helically grooved member and providing a relative adjustment between them.

Another object of the invention is to provide a relative adjustment between the helically grooved member or its cam and the gear by relative movement of the gear with reference to the bearing portion with which the helically grooved member is connected.

Another object of this invention is to provide a means of relative adjustment of the parts without removing the driving gear from its gear train or the journal from the bearing.

More specifically an object of the invention is to provide a coarse adjustment of position between the helically grooved member and one part and a finer adjustment between the gear and this same part, all without necessity of removing the gear from its train or the journal from its bearing that this intermeshing relation need not be disturbed.

Another object of this invention is to provide a cam of a stronger construction than that heretofore provided.

With these and other objects in view, the invention consists of certain novel features of construction, as will be more fully described and particularly pointed out in the appended claims.

In the accompanying drawings:

Fig. 1 is an elevation showing in section the gear attached to the rotary unit of the gill drawing frame;

Fig. 2 is an exploded view illustrating two of the members separated with the attaching rod removed;

Fig. 3 is an elevation of the attaching rod alone;

Fig. 4 is an end view of the structure shown in Fig. 2;

Fig. 5 is a view at the opposite end of Fig. 2;

Fig. 6 is a view of the cam alone;

Fig. 7 is a side elevational view of two pairs of cooperating gill screws at one side of the machine showing the arrangement of their journals and the gears which connect them to be driven in unison from the shaft or spindle of the bottom screw;

Fig. 8 is an elevation illustrating the modified form of structure; and

Fig. 9 is a sectional view on line 9—9 of Fig. 8.

The unit with which this invention is primarily concerned comprises the helically grooved portion which is used for actuating the faller bars of a gill-drawing frame and consists essentially of the gill screw with a cam at the end and a gear for driving the same, which gear meshes with companion gears at one side of the frame for driving the screws in unison. I have provided a helically slotted member separate from the journal so that these two may be relatively adjusted and I have assembled on the ends of the helically slotted member a cam with splines in the member and the cam for the reception of a feather key which is also received in a rod which extends through the two for securing the parts together in non-rotatable relation. I have also provided for a relative adjustment between the gear and the helically grooved member by a connection of the gear to the journal in such a manner that it may be adjusted a fraction of the distance of the adjustment between the journal and the helically grooved member which thus provides a rough adjustment at one point and a finer adjustment at another.

With reference to the drawings, 10 designates a journal member which may be supported in a bearing of the gill drawing frame. This member is provided with a central axial opening 11 through it and is reduced as at 12 at one end to receive a driving gear 13 thereon.

This driving gear 13 is in mesh with other driving gears such as shown in Fig. 7 at 14 above it and at 15 below it, which are driven from a gear 16 forming a train of gears at one side of the machine for transmitting motion from the shaft 17 to all of these units. The gear 13 is locked to the portion 12 of the journal member 10 by a threaded pin 18 which has threaded engagement in an arcuate portion 19 in the gear and in an arcuate portion 20 in the boss 12, which serves as a key and spline connection to hold the gear against rotation on the boss 12. Additional arcuate portions 21 and 22 are provided at 120 degrees apart in the boss 12 while arcuate portions 23 and 24 are provided in the gear 13 which are spaced from the arcuate portion 19 a variation from 120 degrees corresponding to a fraction of the distance between the interengaging serrations 25, 26 so that a finer adjustment may be had than between the serrations which determine the position between the helically slotted member and the journal member.

At the opposite end of the journal member 10 I provide a serrated face 25 with which a serrated face 26 on the helically slotted member 27 will engage. This helically slotted member 27 is provided with a helical groove 28 extending throughout its length for engagement with the faller bars of the machine. It is also provided with an axial opening 29 to align with the axial opening 11 of the journal member. By relative rotation of these members the position of the helical groove with relation to the gear which is secured to the journal member may be provided.

A cam designated generally 30 is formed of substantially a uniform thickness and has an opening 31 to align with the opening 29 in the member 27. This uniform thickness may be interrupted slightly by reason of a recess 32 for accommodation of the end of the screw as at 33 (see Fig. 1) that the screw may retain its thickness for strength to its very end. A rod 35 having a head 36 is positioned through the openings 31, 29, 11 with the head 36 engaging the outer face of the cam 30. Splines 37 in the member 27, 38 in the cam, and 39 in the rod 35 are provided for the reception of a key or feather 40 which lodges in these splines and locks the rod, cam, and helically grooved member 27 together against rotation. The opposite end of the rod 35 is threaded as at 41 and protrudes through the gear 13 where it receives a washer 42 and nut 43 to hold the parts in assembled relation.

For adjustment of the members 27 and 10, it is merely necessary to loosen the nut 43 and move the rod and member 27 away from the member 10 and then relatively rotate them and force them back into engagement where the serrations 25 and 26 will form a lock between them against relative rotation. If a finer adjustment is desired than may be accomplished by means of the interlocking serrations 25 and 26, this may be had by changing the position of the gear 13 with reference to the member 10 by withdrawing the threaded pin 18 and turning the gear on its boss 12 until recesses 21 and 24 align and repositioning the pin 18 therein or turning the gear until recesses 22 and 23 align and positioning the pin 18 therein. This may all be accomplished without the necessity of disturbing the meshing relation between the gear 13 and its other gears 14 and 15 and without withdrawing the journal from its bearing in the frame.

In Figs. 8 and 9, I have shown the journal member 45 as provided with a square shaft 46 extending therefrom and which is held in place by a pin 47. The helically grooved member 48 is provided with a square opening 49 which may be received on the squared shaft to prevent relative rotation. In this case, the squared shaft is provided with a threaded recess 50 in its end and the cam 51 is provided with a square opening to fit onto the shaft and be held thereon by means of washer 52 and screw 53. The position of the helically grooved member 48 may be very quickly determined by means of the square shaft, it being relatively apparent to anyone assembling the mechanism that the cam 51 can go in but two positions on the square shaft and one of these may be readily determined in the positioning of the screw member 47 thereon which enables a very quick choice of positions for assembly.

I claim:
1. In a gill-drawing frame, a rotating unit for traversing the faller bars comprising a journal member, a gear secured thereto, and a helically grooved member, and means to rotatably adjustably secure said helically grooved member to said journal member whereby proper angular relationship may be obtained between the gear and the helically grooved member.

2. In a gill-drawing frame, a rotating unit for traversing the faller bars comprising a helically grooved member, a cam at the end of said member, a rod extending through said member and cam and means on said rod extending through cooperating portions on both said cam and member to lock all of said parts against relative rotation.

3. In a gill-drawing frame, a rotating unit for traversing the faller bars comprising a helically grooved member, a cam at the end of said member, a rod extending through said member and cam and a key on said rod and cooperating grooves on both said cam and member to receive said key and lock said parts against relative rotation.

JOSEPH MONAHAN.

REFERENCES CITED

The following references are of record in the file of this patent:

UNITED STATES PATENTS

| Number | Name | Date |
| --- | --- | --- |
| 1,394,829 | Holdsworth | Oct. 25, 1921 |
| 2,208,318 | Berker | July 16, 1940 |